United States Patent [19]

Scholl et al.

[11] Patent Number: 5,476,892
[45] Date of Patent: Dec. 19, 1995

[54] PROCESS FOR CONDITIONING AND STABILIZING POLYOLS

[75] Inventors: Hans J. Scholl, Cologne; Hartmut Nefzger, Pulheim; Helmut Reiff; Bernd Quiring, both of Leverkusen, all of Germany

[73] Assignee: Bayer Aktiengesellschaft, Leverkusen, Germany

[21] Appl. No.: 164,974

[22] Filed: Dec. 9, 1993

[30] Foreign Application Priority Data

Dec. 17, 1992 [DE] Germany ............ 42 42 621.9
Dec. 24, 1992 [DE] Germany ............ 42 44 007.6

[51] Int. Cl.⁶ .................................................. C08J 3/20
[52] U.S. Cl. ............ 524/263; 252/182.24; 252/182.27; 252/182.28; 252/182.29; 524/140; 524/157; 524/158; 524/165; 524/265; 524/266; 524/267; 524/268; 528/45; 528/51
[58] Field of Search .................................. 524/262, 157, 524/158, 165, 140, 263, 265, 266, 267, 268; 252/182.24, 182.27, 182.28, 182.29

[56] References Cited

U.S. PATENT DOCUMENTS 5,202,358  4/1993  Scholl et al. ............... 521/160
5,260,481  11/1993  Scholl ........................ 560/352
5,342,881  8/1994  Müller et al. ............... 524/700

OTHER PUBLICATIONS

"Polyurethane" Plastics Handbook, vol. 7, edited by Dr. G. Oertel, pp. 42 to 62 (Carl Hanser Verlag, München 1983).

Primary Examiner—Ana L. Carrillo
Attorney, Agent, or Firm—Joseph C. Gil; Lyndanne M. Whalen

[57] ABSTRACT

Polyols are conditioned and stabilized by mixing them at 0 to 150° C. with from about 0.0001 to about 1% by weight, based on the quantity of polyol, of a silylated acid corresponding to the formula:

$$X\text{---}[Si(CH_3)_3]_n$$

in which
  X represents a neutral acid residue obtained by removal of the acidic hydrogen atoms from an n-basic acid having a maximum pKa value of 3, provided that the n-basic acid is not a hydrohalic acid and
  n represents an integer of from 1 to 3.

The resultant polyol is characterized by good color and activity properties. The stabilized polyols are particularly useful in the production of polyurethanes, particularly polyurethane foams.

5 Claims, No Drawings

PROCESS FOR CONDITIONING AND STABILIZING POLYOLS

BACKGROUND OF THE INVENTION

The present invention relates to a new process for conditioning and stabilizing polyols in which the polyol is mixed with a silylated acid.

Production-related impurities of polyols vary in type and quantity. These impurities cause fluctuations in activity and color problems which affect products made with those polyols. Limitation of these impurities (i.e. narrowing of the specification of polyols), is important to improved and hence more economical handling of polyols.

SUMMARY OF THE INVENTION

It is an object of the present invention to provide a new method for conditioning and stabilizing polyols.

It is also an object of the present invention to provide a process for conditioning and stabilizing polyols in which the activity and color problems encountered with known polyols are substantially avoided.

It is another object of the present invention to provide a process for conditioning and stabilizing polyols which improves the processability of those polyols.

These and other objects which will be apparent to those skilled in the art are accomplished by adding a small amount of certain silylated acids, which are described in more detail below, to the polyol or polyols to be treated.

DETAILED DESCRIPTION OF THE INVENTION

The present invention relates to a method for conditioning and stabilizing polyols in which a polyol is mixed at from about 0 to about 150° C. with from about 0.0001 to about 1% by weight, based on the amount of polyol, of a silylated acid corresponding to the formula:

$$X-[Si(CH_3)_3]_n$$

in which

X represents a neutral acid residue obtained by removal of the acidic hydrogen atom(s) from an n-basic acid having a maximum pKa value of 3, provided that the n-basic acid is not a hydrohalic acid and n represents an integer of from 1 to 3.

The present invention also relates to polyols conditioned by this process and to the use of these conditioned polyols as starting materials in the production of polyurethane plastics by the isocyanate polyaddition process.

Any polyol may be used as a starting material for the process of the present invention. However, it is preferred that polyols of the type used in polyurethane chemistry be employed. Examples of these polyols include polyether polyols and polyester polyols such as those described, for example, in Kunststoff-Handbuch "Polyurethane", Vol. 7, edited by Dr. G. Oertel, pages 42 to 62 (Carl Hanser Verlag, München 1983).

The polyols to be used in the process of the present invention are hydroxyfunctional compounds, particularly compounds containing from 2 to 8 hydroxyl groups and having a molecular weight in the range of from about 400 to about 6,000. Polyethers and polyesters containing at least 2, generally 2 to 8 and preferably 2 to 6 hydroxyl groups are among the most preferred polyols.

In the process of the present invention, a total of from about 0.0001 to about 1.0% by weight, preferably from about 0.001 to about 0.1% by weight, based on polyol(s), of certain compounds containing trimethyl silyl groups is added to the polyol(s). The optimum amount of these compounds may readily be determined by a preliminary test. The compounds containing trimethyl silyl groups are added at a temperature in the range of from about 0° to about 150° C., preferably at a temperature in the range of from about 20° to about 100° C.

The additives required in the present invention are silylated acids corresponding to the formula:

$$X-[Si(CH_3)_3]_n$$

in which X and n are as defined above. X preferably represents the neutral acid residue of an oxygen-containing acid having n acidic hydrogen atoms and a maximum pKa value of 2.

Examples of suitable acids include: silylated sulfonic acids such as trifluoromethane sulfonic acid trimethyl silyl ester, nonafluorobutane sulfonic acid trimethyl silyl ester, alkylbenzene sulfonic acid trimethyl silyl ester and methane sulfonic acid trimethyl silyl ester; silylated esters of acids of phosphorus, such as phosphoric acid tris-(trimethyl silyl ester) or phosphoric acid diethyl ester trimethyl silyl ester.

The silylated acid additives required in the present invention are added to the polyol(s) in a quantity of from about 0.0001 to about 1.0% by weight, preferably in a quantity of from about 0.001 to about 0.1% by weight, based on polyol(s). The optimum amount of additive may readily be determined by a preliminary test. These additives are added to the polyol(s) at a temperature in the range of from about 0° to about 150° C., preferably at a temperature in the range of from about 20° to about 100° C.

Polyols conditioned and stabilized in accordance with the present invention exhibit reduced variations in activity and reduced traces of coloring impurities. This may be easily demonstrated by secondary reactions, for example, by the production of polyurethane plastics by the isocyanate polyaddition process.

The polyols which have been conditioned and stabilized in accordance with the present invention may be reacted with any of the known isocyanates under suitable isocyanate addition polymerization conditions to produce polyurethanes.

Having thus described our invention, the following Examples are given as being illustrative thereof. All parts and percentages given in these Examples are parts by weight and percentages by weight, unless otherwise indicated.

EXAMPLES

EXAMPLE 1

General production of silylated sulfonic acids:

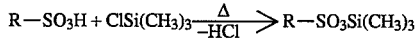

2 equivalents of trimethyl chlorosilane were slowly added dropwise with stirring under nitrogen to 1 equivalent of sulfonic acid (in the absence of moisture) at a temperature of 30° to 50° C. The mixture was then stirred at approximately 80° C. until the evolution of HCl had ceased. The silylated sulfonic acid was then purified by distillation.

| Product | R | Yield | Bp [°C.]/torr |
|---|---|---|---|
| A | CH$_3$ | 80% | 95–98/20 |
| B | C$_4$F$_9$ | 95% | 77–79/25 |
| C | C$_n$H$_{2n+1}$ 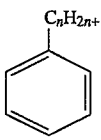 (n = 10–13) | 90% | Thin-layer evap.: oil: 240° C./0.1 |

According to 1H-NMR, gas chromatography, the purity of all products was >95%.

EXAMPLE 2

In two parallel batches, A and B, 14.2 g of polyethylene glycol having an average molecular weight of 1,500 (Merck), were reacted with 5.8 g of 2,4-tolylene diisocyanate in 30 g of dimethyl acetamide (high purity, redistilled) at 44° C. To the batch made in accordance with the present invention (A), 500 ppm of trifluoromethane sulfonic acid trimethyl silyl ester (which is commercially available under the name TMS-Triflat, a product of Fluka), based on the NCO prepolymer to be formed were added.

| Batch | A | B |
|---|---|---|
| TMS-Triflat | 500 ppm | — |
| Exotherm (3 mins.) | 50° C. | 52° C. |
| Color | Colorless | Yellow |
| NCO (calculated) | 10.0% | 10.0% |
| NCO (found) | 10.0% | 6.7% |
| Solids content | 40.0% | 40.0% |
| End product (20 min./50° C.) | Clear, yellowish solution | Distinctly more viscous yellow solution |
| Final NCO value | 9.5% | 1.0% |

An NCO prepolymer in solution was obtained when the silylated acid was included in Batch A in accordance with the present invention. However, in Batch B prepared without the silylated acid TMS-Triflat, a dark-colored, highly viscous polyurethane solution with an NCO value of 1.0% was obtained after secondary reactions (loss of NCO).

The NCO prepolymer prepared in accordance with the present invention could be satisfactorily dispersed in 80 ml water. The parallel batch without the TMS-Triflat did not absorb any water and could not be dispersed in water.

EXAMPLE 3

In 2 parallel batches, A and B, 10 g of polyethylene glycol having an average molecular weight of 425 (available from Riedel de Haen), were reacted with 10 g of 2,4-tolylene diisocyanate in 50 g of dimethyl acetamide (high purity, redistilled) at 24° C. The batch according to the invention (A) also included 250 ppm TMS-Triflat, based on the NCO prepolymer to formed.

| Batch | A | B |
|---|---|---|
| TMS-Triflat | 250 ppm | — |
| Exotherm. (3 mins.) | 41° C. | 43° C. |
| Color | Pale yellow | Yellow brown |
| NCO (calculated) | 13.4% | 13.4% |
| NCO (found) | 13.2% | 9.5% |
| Solids content | 28.6% | 28.6% |
| End product 10 mins./50° C. | Clear, yellowish solution | Gel, cross-linked |

An NCO prepolymer having the desired properties was obtained from Batch A which included the polyol conditioned in accordance with the present invention. Batch B in which no TMS-Triflat was included, produced a dark-colored, crosslinked polyurethane after secondary reactions (loss of NCO).

EXAMPLES 4 AND 5

In 2 parallel batches, A and B, 14.2 g of polyethylene glycol having an average molecular weight of 1,500 (Merck), were reacted with 5.8 g of 2,4-tolylene diisocyanate in 30 g of dimethyl acetamide (high purity, redistilled) at 40° C. The procedure was as described in Example 3, with the exception that 400 ppm perfluorobutane sulfonic acid trimethyl silyl ester, product B of Example 1, and 300 ppm methane sulfonic acid trimethyl silyl ester, product A of Example 1, were added for stabilization in Examples 4 and 5, respectively. To this end, the trimethyl silyl ester was added to the batch immediately before the isocyanate was added.

The results are tabulated below:

|  | Example 4 | Example 5 |
|---|---|---|
| Silylated acid | 400 ppm | 300 ppm |
| Exotherm (3 mins.) | 47° C. | 46° C. |
| Color | Colorless | Colorless |
| NCO (calculated) | 10.0% | 10.0% |
| NCO (found) | 9.8% | 9.7% |
| Solids content | 40.0% | 40.0% |
| End product 20 mins./50° C. | Clear yellowish solution | Clear yellowish solution |

EXAMPLE 6

0.5 g of n-alkylbenzene sulfonic acid trimethyl silyl ester (product C of Example 1) were added with stirring at approximately 50° to 60° C. to 5 kg of molten water-free poly(ethylene adipate) with a number average molecular weight of 2,000 g/mol (OH value 56). The poly(ethylene adipate) thus conditioned had a concentration of 100 ppm silyl compound. The material was divided into two batches, A and B, one of which was stirred at room temperature (Batch A) while the other was stored at 50° to 60° C. (Batch B). Samples were taken from each of the two batches at certain time intervals (1, 3, 7 and 14 days). A semiprepolymer (100 parts poly(ethylene adipate) and 24 parts NDI) was prepared by reaction with 1,5-naphthylene diisocyanate (NDI), cooled to 90° C. and stored at that temperature. After 1 hour and 24 hours (double determination), the viscosity was determined using a Haake spindle viscosimeter. The results are set out in Table 1.

TABLE 1

| Batch | Storage (at °C.) | Time (days) | Amount (ppm) | Viscosity[1] (1 hr.) | Viscosity[1] (24 hrs.) |
|---|---|---|---|---|---|
| A | 23 | 1 | 100 | 2000 | 4400 / 4500 |
| A | 23 | 3 | 100 | 1900 | 4400 / 4400 |
| A | 23 | 7 | 100 | 2400 | 5200 / 5400 |
| A | 23 | 14 | 100 | 2200 | 4400 / 4400 |
| B | 50 | 1 | 100 | 1900 | 4500 / 4600 |
| B | 50 | 3 | 100 | 2800 | 4500 / 4400 |
| B | 50 | 7 | 100 | 2900 | 5400 / 5400 |
| B | 50 | 14 | 100 | 2700 | 5200 / 5400 |
| C[2] | 23 | — | — | 3300 | Gels |

[1]mPas $^{90° C.}$
[2]Comparative, see example 9

EXAMPLE 7

0.25 g of trifluoromethane sulfonic acid trimethyl silyl ester (TMS-Triflat) were stirred at approximately 50° to 60° C. into 5 kg of molten water-free poly(ethylene adipate) having a number average molecular weight of 2,000 g/mol (OH value 56). As described in Example 6, an NCO semiprepolymer was prepared from the conditioned poly(ethylene adipate) and subjected to viscosity measurement. The results are set out in Table 2.

TABLE 2

| Sample | Amount (ppm) | Viscosity mPas$^{90° C.}$ (1 hr.) | Viscosity mPas$^{90° C.}$ (24 hrs.) |
|---|---|---|---|
| A | 50 | 2100 | 5100 / 5400 |
| B[2] | — | 3300 | Gels |

[2]Comparative, see example 9

EXAMPLE 8

10.7 g of a freshly prepared mixture made up of 97.9 parts of poly(ethylene adipate) with a number average molecular weight of 2000 g/mol (OH value 56) and 2.1 parts of trifluoromethane sulfonic acid trimethyl silyl ester (TMS-Triflat) were stirred at approximately 130° C. into 5 kg of molten, water-free poly(ethylene adipate) having a number average molecular weight of 2,000 g/mol (OH value 56). Immediately afterwards, the conditioned polyol was reacted with 1,5-naphthylene diisocyanate (NDI) (100 parts poly(ethylene adipate): 24 parts NDI) to form a semiprepolymer which was rapidly cooled to 90° C. on completion of the reaction. The results are set out in Table 3.

TABLE 3

| Sample | Amount (ppm) | Viscosity mPas$^{90° C.}$ (1 hr.) | Viscosity mPas$^{90° C.}$ (24 hrs.) |
|---|---|---|---|
| A | 50 | 2100 | 6200 / 6200 |
| B[2] | — | 3300 | Gels |

[2]Comparative, see example 9

EXAMPLE 9 (COMPARATIVE)

The preparation of the comparative example denoted as "Batch C" in table 1, "Sample B" in table 2 and "Sample B" in table 3 respectively was done as follows:

100 parts of water-free poly(ethylene adipate) with a number average molecular weight of 2000 g/mol (OH value of 56) were reacted with 24 parts of 1,5-naphthylene diisocyanate (NDI) to form a serf prepolymer. The semiprepolymer was cooled to 90° C. and stored at that temperature. After 1 hour and 24 hours, the viscosity was determined using a Haake spindle viscosimeter.

The results are given in table 4:

TABLE 4

| (Comparative) | | | |
|---|---|---|---|
| storage (at °C.) | Amount (ppm) | Viscosity[1] (1 hr.) | Viscosity[1] (24 hrs.) |
| 23 | — | 3300 | gels |

[1]mPas$^{90° C.}$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for conditioning and stabilizing polyols comprising mixing a polyol with from about 0.0001 to about 1% by weight, based on the quantity of polyol, of a silylated acid corresponding to the formula:

$$X-[Si(CH_3)_3]_n$$

in which

X represents a neutral acid residue obtained by removing acidic hydrogen atoms from an n-basic acid having a maximum pKa value of 3, provided that the n-basic acid is not a hydrohalic acid and n represents an integer of from 1 to 3 at a temperature of from about 0° to about 150° C.

2. The process of claim 1 in which an O-silylated, oxygen-containing acid which, in non-silylated form, has a maximum pKa value of 2 is used as the silylated acid.

3. The process of claim 1 in which the silylated acid is selected from trifluoromethane sulfonic acid trimethyl silyl ester and alkylbenzene sulfonic acid trimethyl silyl ester.

4. The polyol produced by the process of claim 3.

5. The polyol produced by the process of claim 1.

* * * * *